9779X
No printed specification available
S. Tyler.
Churn.
Patented Jun. 26, 1836.
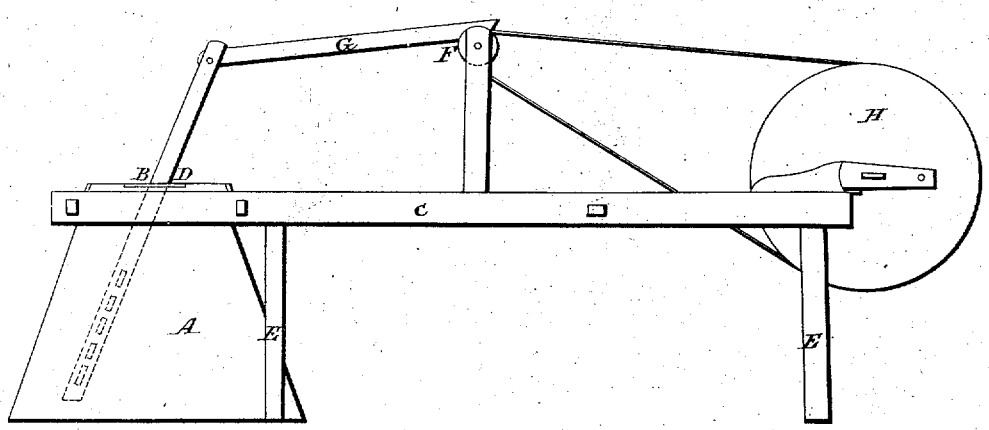
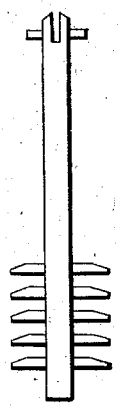

97799X June 25, 1836 35

Samuel Tyler, of New Gloucester State of Maine,

Letters Patent.

The schedule referred to in these Letters Patent and making part of the same containing a description in the words of the said Samuel Tyler himself of his improvement in the Churn.

To all to whom these presents shall come.

Be it known that I Samuel Tyler of New Gloucester in the County of Cumberland and State of Maine, have invented a new and useful improvement in a Machine for Churning butter from Milk and Cream and that the following is a full and exact description thereof.

I make the churn box two feet high and about six inches by eight at the top and about sixteen by eight at the bottom, the cover is put in by rabbiting on the inside of the box all round three eighths deep and two inches down or it may be collared round the top with thin boards A, this box is made of pine boards one inch thick, Through the centre of the cover there is made a mortice one and a half inches square B. Through this mortice is fitted the Staff or dash by means of a wooden pin which acts as a gudgeon making it fast to the cover and allowing it to vibrate so as to nearly touch each side on the inside at the bottom of the Churn. This Staff rises above the top of the cover from twelve to twenty inches as the case may require. In the lower end of this staff inside of the churn there is fitted from six to ten paddles by morticing through the staff, which operate upon the cream or a flat [illegible] may be substituted in its stead, I also make a frame from three to four feet long of timber two inches square with three cross pieces and two bed pieces, C. these are put together with tenons and mortices framing the bed pieces eight inches asunder, one of these cross pieces is framed into the end of the bed pieces. another so far on the bed pieces as to leave a space between the first and second of six inches making an oblong square six by eight inches in the clear so as to fit round the top of the churn (D) the other cross piece is framed

9774X on half way between the last mentioned cross piece & the end of the bed timbers, This frame stands on four legs slanting outward, in the centre of these bed pieces and on the top there is fitted two standards three inches wide and one and a half inches thick and eighteen inches long, these stand perpendicular (E) In the top of these standards there is fitted an iron crank, the bend of the crank is nearly in the centre, between the posts on the same crank and near the bend is fitted a pully six inches in diameter (F) in the bend of the crank there is fitted one end of a sweep of sufficient length to reach the top of the before described staff, and is fitted into the top of the staff by means of a slip mortice and is so pinned as to allow it to vibrate (G) On the extreme end of this frame opposite the churn, there is fitted a shaft and crank reaching from one bed piece over the other far enough to allow the crank to turn, on this shaft is fitted a wheel two inches thick and sixteen inches in diameter (H) I then put a band round this wheel and round the pulley on the before described crank and turn the last mentioned crank which puts the machine in motion.

This machine may be moved by cog wheels in the same form, The iron crank may be made double and fitted to carry or ply two dashes at the same time — This whole machine may be enlarged or diminished as the case may require by observing a regular proportion.

What I claim as my own invention and not previously known in the above described machine is the large wheel, the crank and pulley and the sweep together with the frame which may be put on or taken off the churn at pleasure; or the uniting the several principles to make a machine as now United, ——

Witnesses
Angeline Lane
Joseph Turner

Saml Tyler

810 [illegible]

C.y.l
Ch[illegible]

Drawing